Sept. 26, 1944.    H. E. SOMES    2,359,059
SEQUENCE CONTROLLER MECHANISM
Original Filed May 10, 1941    5 Sheets-Sheet 4
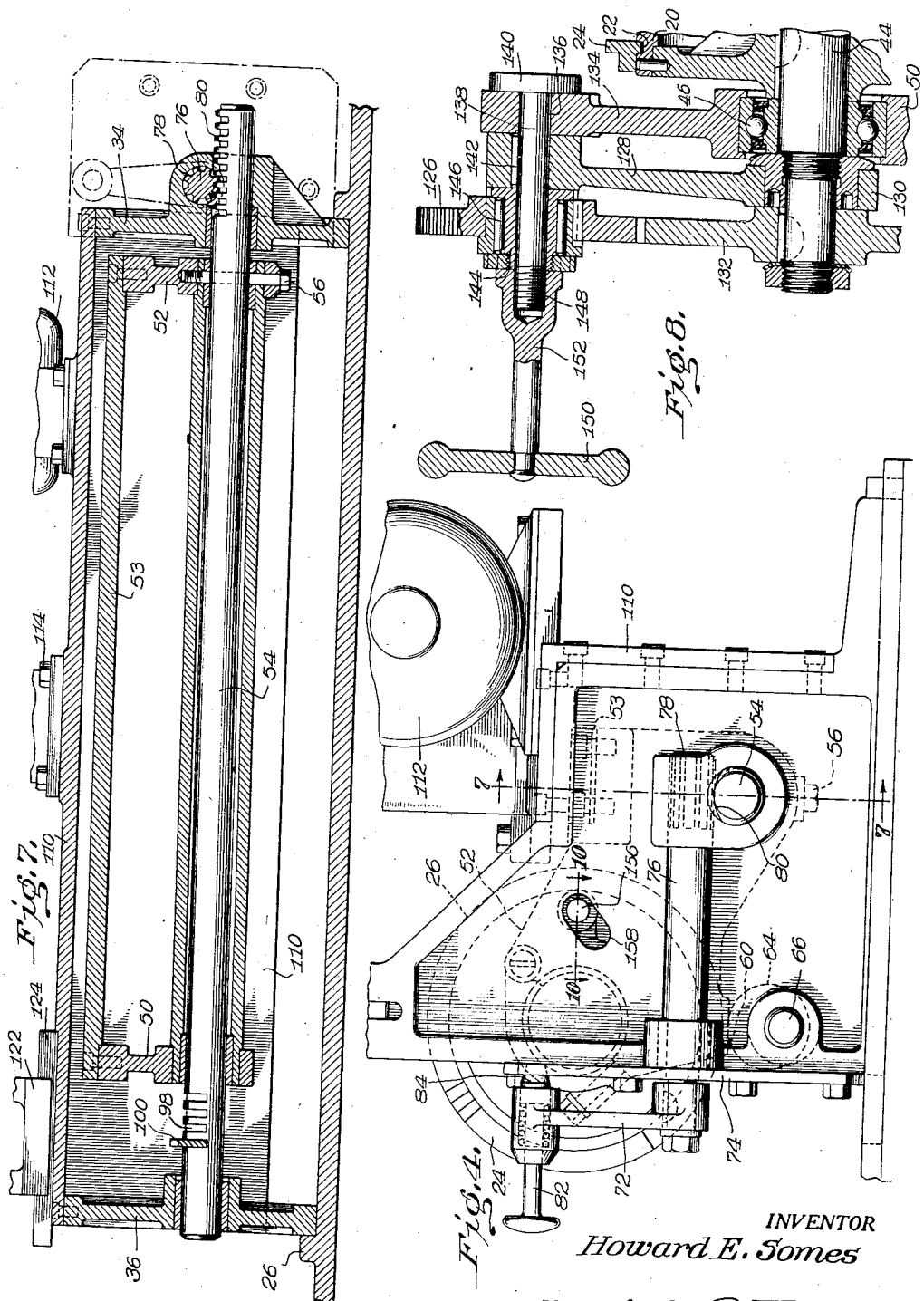
INVENTOR
Howard E. Somes
BY John P. Tarbox
ATTORNEY Sept. 26, 1944.  H. E. SOMES  2,359,059
SEQUENCE CONTROLLER MECHANISM
Original Filed May 10, 1941  5 Sheets-Sheet 5

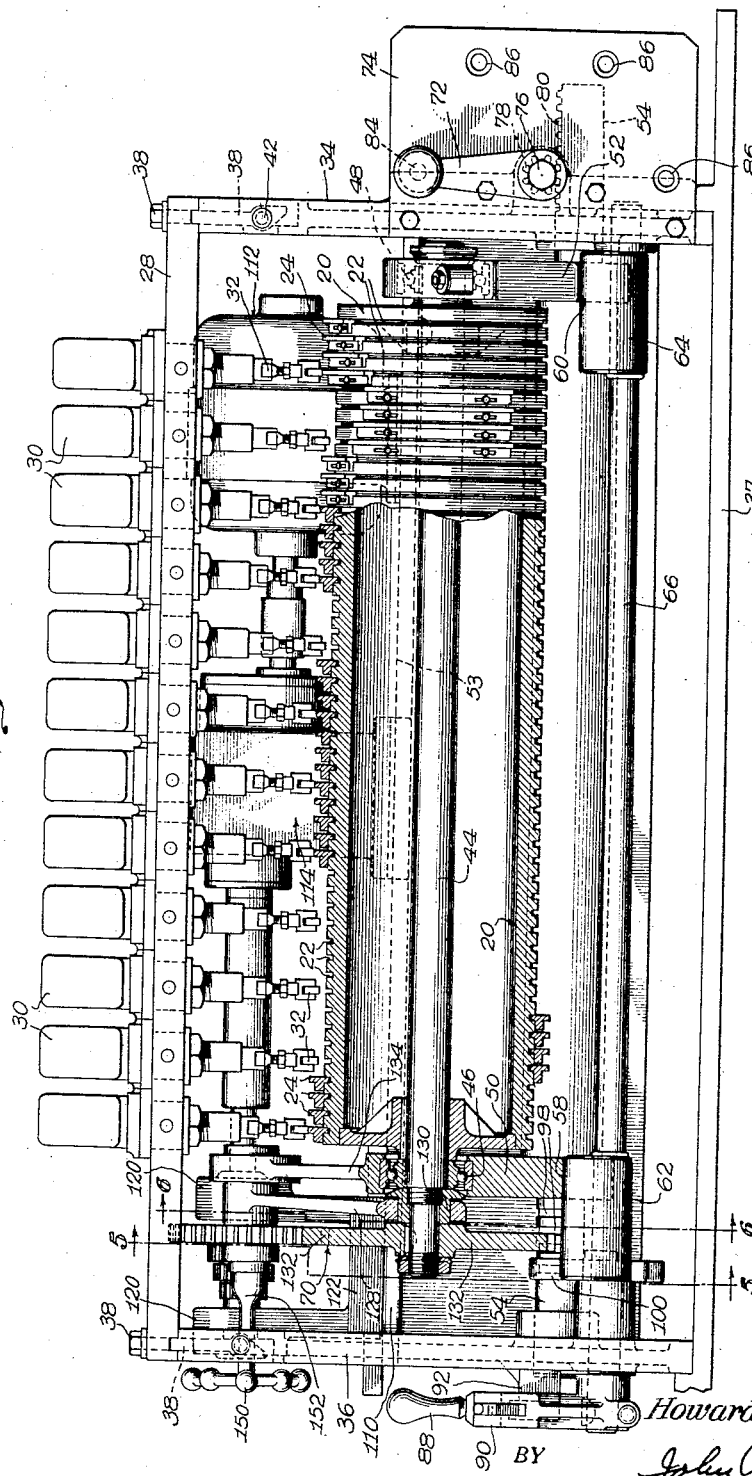

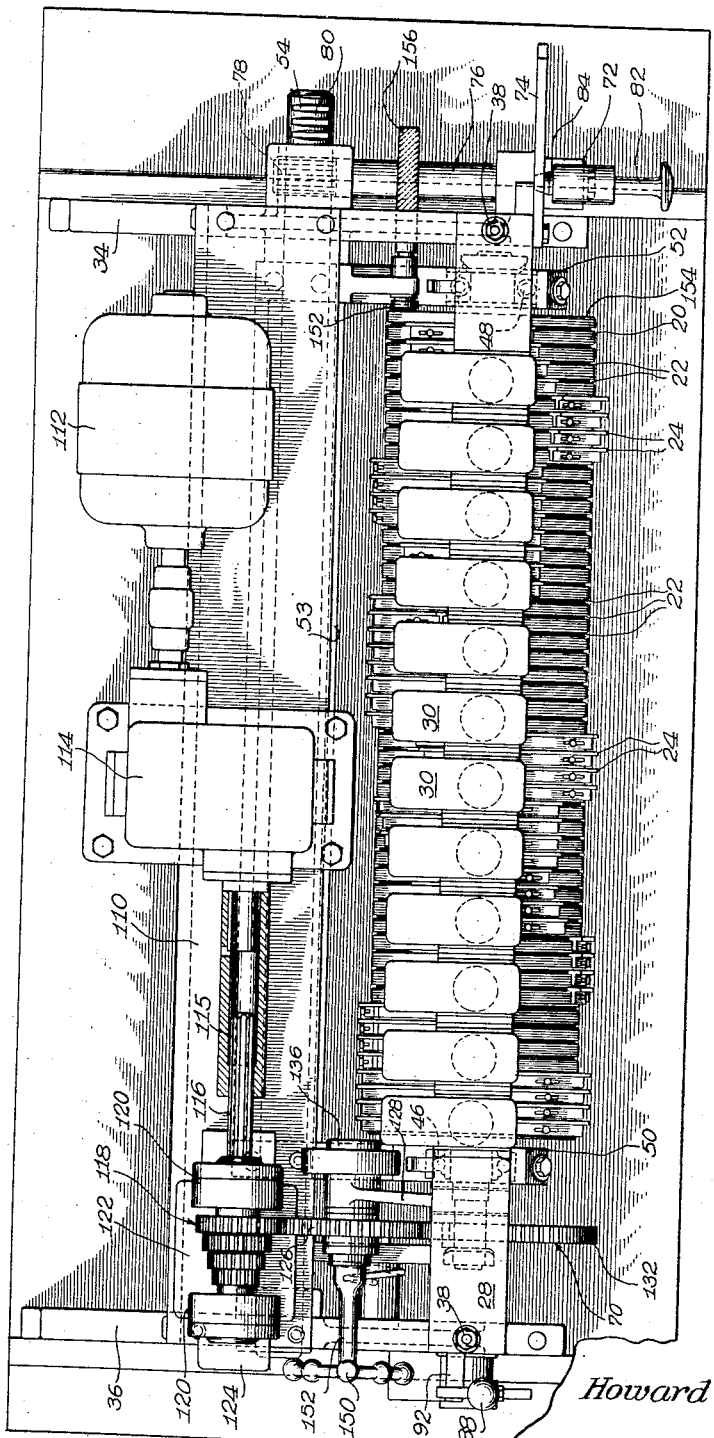

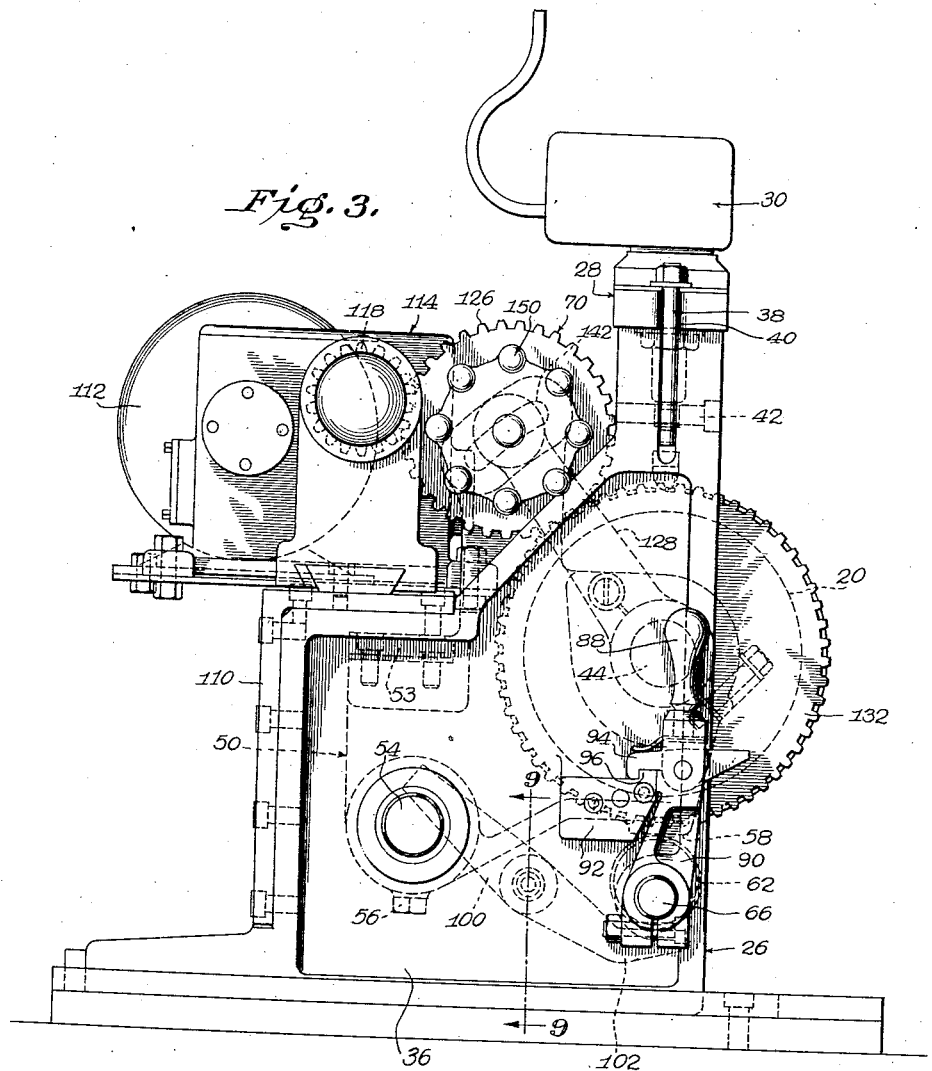
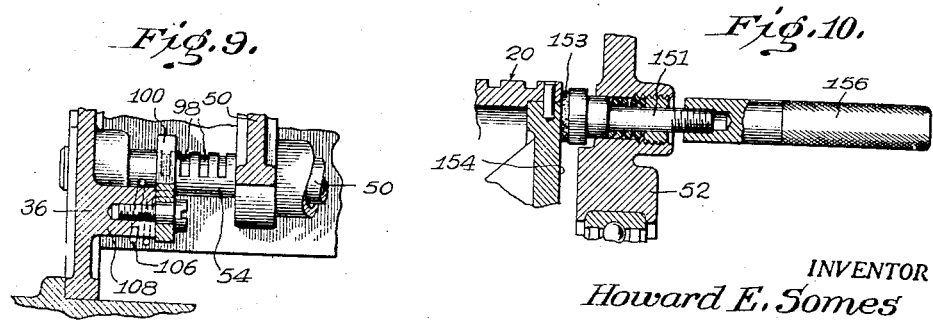

INVENTOR
Howard E. Somes
BY
John P. Tarbox
ATTORNEY

Patented Sept. 26, 1944

2,359,059

UNITED STATES PATENT OFFICE 2,359,059

SEQUENCE CONTROLLER MECHANISM

Howard E. Somes, Detroit, Mich., assignor to Budd Induction Heating, Inc., Philadelphia, Pa., a corporation of Michigan Original application May 10, 1941, Serial No. 392,867. Divided and this application July 7, 1942, Serial No. 450,034

12 Claims. (Cl. 74—568)

This invention is a division of my copending application, Serial No. 392,867, filed May 10, 1941, for Heat treating apparatus.

The present invention relates to timing apparatus, more particularly to apparatus of the rotary drum type for operating a plurality of control devices, such as for example, switches or valves in predetermined sequence. In my copending application aforesaid, I have disclosed and described an induction heat treating machine in which the various parts thereof and their operations, such as the shutting on and off of the electrical energy, the quenching medium and the cooling medium for the transformer and inducing coils, and the actuation of such devices as the work feeding means, the quench head and the switching transformer are controlled in predetermined sequence or timed relation. Articles of different characteristics as to diameter, length and metallurgical composition require different treatments and as a result the operation of the various machine elements requires different timing for different articles.

Sequence controllers of the conventional drum type employ series of cams for operating the different valves or switches in predetermined order and it is obvious that in such apparatus having, for example, ten or twelve control switches or valves, it is necessary in changing over for operation on different articles to expend considerable time in making the necessary cam adjustments.

Accordingly, one of the objects of the present invention is the provision of an improved sequence controller which is capable of quick and easy change in timing without the necessity of effecting a plurality of adjustments.

Another object is to provide a sequence controller with a plurality of sets of commonly-carried operating cams in which each set can be preliminarily adjusted for a given timing condition and in which a change from one timing condition to another can be readily and easily effected by merely shifting the common cam carrying means to position a desired set of cams in operative position.

A further object is to provide a sequence controller with an axially shiftable cam supporting drum and in which improved adjustable means is provided for connecting the drum and its operating mechanism.

With the above and other objects in view, which will be apparent from the following description, the present invention consists in certain features of construction and combinations of parts to be hereinafter described with reference to the accompanying drawings, and then claimed.

In the drawings which illustrate a suitable embodiment of the invention,

Figure 1 is a side elevation of the sequence controller of the present invention, parts thereof being shown in section to illustrate detailed features of construction;

Figure 2 is a top plan view of the controller shown in Figure 1;

Figure 3 is a left end elevation of the controller as illustrated in Figure 1;

Figure 4 is a right end elevation of the controller as illustrated in Figure 1;

Figure 7 is a vertical longitudinal section taken substantially on the line 7—7 of Figure 4;

Figure 8 is a section taken substantially on the line 8—8 of Figure 5;

Figure 9 is a fragmentary section taken substantially on the line 9—9 of Figure 3; and Figure 10 is a horizontal fragmentary section taken substantially on line 10—10 of Figure 4.

Figure 5:
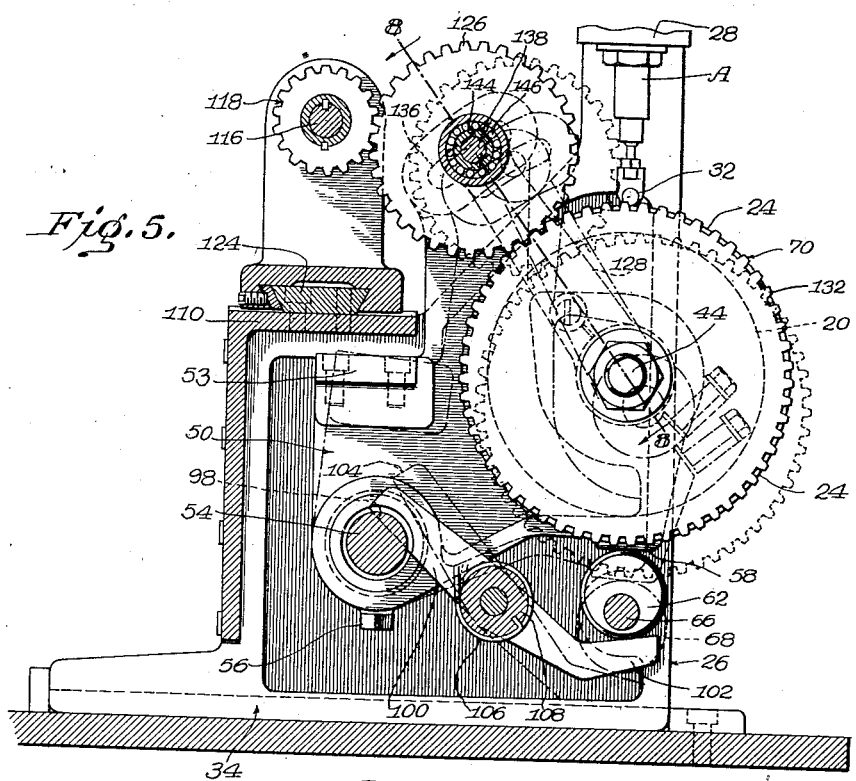
Figure 5 is a vertical section taken substantially on the line 5—5 of Figure 1.
Figure 6:
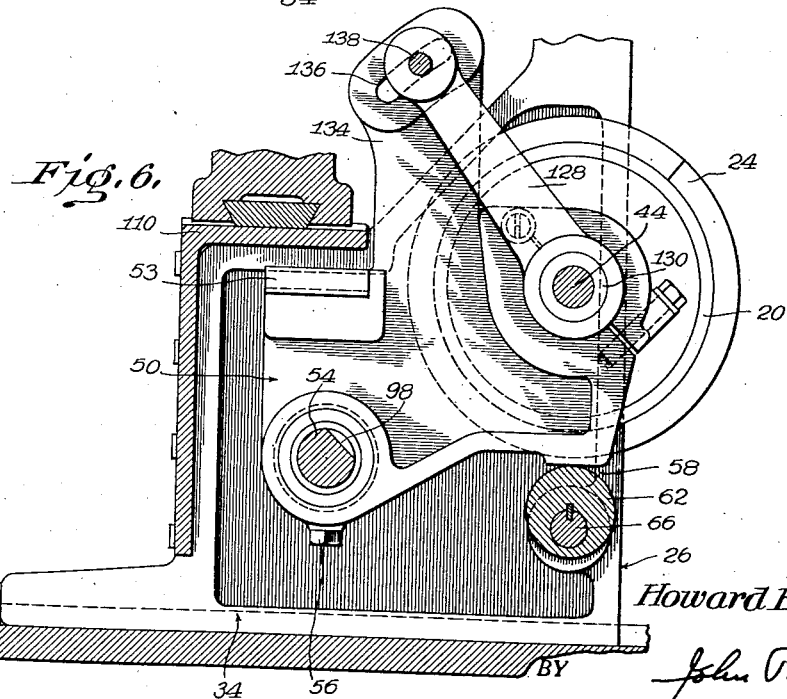
Figure 6 is a vertical section taken substantially on the line 6—6 of Figure 1.

Referring to the accompanying drawings in which like numerals refer to like parts throughout the several views, the sequence controller is of the rotary drum type and although shown in my copending application in connection with an induction heat treating machine it is applicable for use in any character of apparatus wherein a plurality of operations are to be controlled in predetermined timed sequence through switches, valves and the like.

Referring to Figure 1, the sequence controller will be seen to comprise a drum 20 having a plurality of cam circumferential grooves 22 thereon and suitable cams 24. The drum is rotatable with respect to the frame 26 and switch bar 28, there being a plurality of switches 30 (diagrammatically illustrated) arranged on the bar 28 and provided with cam followers 32 for actuating the same, the followers being adjustably depending from the switches 30 and adapted to engage certain of the cams 24. It is to be understood that valves of any suitable type may be substituted for the switches 30 and operated by the followers 32. As will be seen from the drawings, the frame 26 comprises end members 34 and 36 mounted on and securely fastened to a base member 37. The switch supporting bar 28 is detachably secured to the end members 34 and 36 through the pivoting bolts 38 (see Figure 3). The bolts 38 engage the bar 28 through end slots 40 so that by swinging the same about the pivots 42 the switch bar 28 may be quickly removed if desired, to facilitate adjustment and changes in the switches as well as access to the controller apparatus.

As will be observed from Figure 1 the drum 20 is provided with four times the number of cam grooves 22 as switches 30, there being forty-eight grooves in number and twelve switches. At any one time every fourth cam 24 is adapted to engage a switch 30 during a complete revolution of the drum 20 and in order to vary the sequence in which the switches 30 are operated for different conditions, the cam drum 20 is adapted to be shifted axially in order to present a new series of cams for sequential operation of the switches 30.

For this purpose, the cam drum 20 is mounted upon a drive shaft 44 which in turn is journalled in bearings 46 and 48 at either end, the bearings being carried within pivotal arms 50 and 52. The arms are tied together by a rail 53 and pivotally arranged upon the longitudinally extending reciprocable and rocking shaft 54, extending between the end frame members 34 and 36. The arm 50 is secured to the shaft 54 by a through bolt 56 and is held against rotation by the abutment faces 58 and 60 on the underside of each arm which engage with eccentric cams 62 and 64 mounted upon a rotatable shaft 66 extending between the end frame members 34 and 36 (see Figure 1).

The assembly including the drum 20, shaft 54 and the bearing support arms 50 and 52 is shiftable longitudinally and rotatable angularly, upon the rotation of the eccentric cams 62 and 64 to a position substantially at 180° from that illustrated in Figure 1, which 180° position is indicated by the reference character 68 in Figure 5. It will be observed in Figure 5, that when the assembly of pivot arms 50 and 52, the shaft 54 and drum 20 is rotated by reason of the shifting of the cams 62 and 64 to the position shown at 68, the drum 20 and the parts associated therewith are lowered with reference to the cam followers 32 of the cam operated switches 30 so that longitudinal shifting of the drum may be effected without interference with the switch cam followers as will hereinafter appear. The gear drive, indicated generally by the reference character 70, for the drum, will likewise be disengaged by such angular movement, permitting longitudinal movement of the drum for shifting from one set of cams out of, to another set into operative relation with the switches 30.

When the drum is in the lower position, as is indicated in dotted outline in Figure 5, the drum may be shifted to the right or left by the indexing crank 72 pivotally arranged on the indexing plate 74 which is secured to the end frame member 34 (see Figure 1). As will be seen in Figures 4 and 7 the indexing crank 72 is adapted to rotate a shaft 76 having gear teeth 78 meshing with circular rack teeth 80 arranged in the end of the shaft 54 of the drum carrying assembly. It will thus appear that through the rotation of the crank 72, the shaft 54 may be shifted to the left from the position shown in Figure 1 or 7, any desired amount by releasing the crank 72 and its lock 84 from the indexing apertures 86 and rotating to any one of four positions. Through the engagement of the spring pressed knob and pin 82 carried in the crank, the pin lock 84 is adapted to engage the apertures 86 in the indexing plate 74 so as to fix the drum in any particular chosen position and prevent its shifting therefrom.

When the drum is in a particular desired position, the assembly including the pivot arms 50 and 52, and the shaft 54, is rotated upwardly, through the rotation of the eccentric cams 62 and 64, to the upper position, the latter being effected through manipulation of handle 88 on the lever 90 (see Figure 3). The lever 90 is correctly positioned in its upward position, when the drum is in raised position, by its engagement with an abutment 92 on the end frame 36 and latched in position by the spring pressed dog 94 engaging the shoulder 96 on the abutment 92.

Provision is made to interlock the indexing crank 72 so that manipulation thereof cannot be effected when the lever 90 is in the upward or locked position illustrated in Figure 3. For this purpose, the shaft 54 is provided with notches 98, one for each indexing position or four notches in all into which a lever lock 100 pivoted on the end frame 36 is adapted to drop to prevent longitudinal movement of the shaft 54. The lever lock 100, however, is provided with an oppositely extending arm 102 adapted to engage the eccentric cam 62 on its underside so that upon rotation thereof to the position indicated at 68 (see Figure 5), the lever lock will be raised to the position shown at 104 and out of engagement with the notches 98. To assure the lever lock 100 against jarring free of the notches 98, a spiral spring 106 is provided upon the boss 108 to which the lever lock is pivoted, the spiral spring 106 urging the lock in a counterclockwise direction as is illustrated in Figures 3 and 5.

The drive for the drum is effected through the chain of gears as has been indicated by the reference characters 70. For this purpose, the frame is provided with a back shelf 110, upon which is mounted a drive motor 112 coupled to a reduction gear 114, the reduction gear being splined as at 115 to a shaft 116 carrying a bank of pinions 118, and the shaft 116 being journalled in spaced bearings 120 carried upon a base 122 which is longitudinally shiftable upon a way 124. The pinions 116 may be of varying diameter to afford changes in speed of drive and shiftable with the base 122 on its way 124. In order to accommodate a gear drive to the drum from any one of the various different diameter pinions, an idler gear 126, angularly adjustable with respect to the axis of the drum so that the idler gear may be swung to a position so as to mesh with any desired pinion 116, as is illustrated in Figure 1, is provided. The idler gear 126 is journalled upon an arm 128 rotatable about the drum shaft 44, the arm being journalled on a bearing sleeve as at 130. It will be appreciated that the arm is free to swing to any such position as may be necessary to engage the idler gear 126 with a pinion 122 and is of the correct length to maintain the idler gear 126 in proper mesh with the main drive gear 132, keyed to the drum drive shaft 44. In order to fix the position of the arm 128 in any desired position, the bearing arm 50 is provided with an extension arm 134 having an arcuate slot 136 therein through which a shaft 138, upon which the idler gear 126 rotates, extends. The shaft 138 is provided with a head 140 on one side of the arm 134 and the slot 136. The shaft 138 is also keyed to the bearing support arm 128 as at 142 to prevent rotation and is provided with a sleeve 144 having an antifriction bearing 146 for the idler gear 126. The shaft 138 is threaded at 148 to receive a hand wheel 150 having a complementary threaded shank 152.

It will appear that by rotation of the hand wheel 150 the shaft 138 may serve to clamp the arm 128 and the arm 134 together at any angular position through the compressional force transmitted through the sleeve 144 by the shank 152 of the hand wheel 150. Thus by loosening the hand wheel 150 the idler gear may be angularly shifted to engage any one of the pinions 118 with extreme precision so that through the use of accurately ground gears, a positive, perfect and uniform drive between the motor 112 and the controller drum is assured. However, to assure against backlash the bearing support arm 52 of the controller drum assembly may be provided with a spring pressed plunger 151 having a friction face 153 adapted to frictionally rub against the end face 154 of the controller drum thus positively assuring absence of backlash. The plunger 151 is provided with a handle 156 extending through an arcuate slot 158 in the end frame member 34 so that it may be released to free the rotation of the drum manually as desired for setting the drum to any desired starting position.

It can be seen from the foregoing that I have provided a sequence controller with an axially shiftable cam-carrying drum which can be provided with a plurality of sets of cams in which each set can be adjusted for a given timing condition and wherein the drum can be quickly and easily shifted to position any set into operative relation with the switches or valves to be operated thereby.

It is to be understood that various changes may be made in the detailed construction of the various parts without departing from the spirit and substance of the invention, the scope of which is defined by the appended claims.

What is claimed is:

1. A timing device comprising a frame, a plurality of cam operated control means on said frame, a roll having a plurality of sets of cams for actuating said control means, means for shifting said roll relative to said control means to engage different sets of cams with said control means, and means for bodily moving said roll away from said control means to facilitate the shifting of said roll relative to said control means.

2. A timing device comprising a frame, a plurality of cam operated control means on said frame, a roll having a plurality of sets of cams for actuating said control means, means for moving said roll relative to said control means to clear of said control means, and means for axially moving said roll relative to said control means to bring a different set of cams into position for actuating said control means.

3. A timing device comprising a frame, a plurality of cam operated control means on said frame, a roll having sets of cams for actuating said control means, means for moving said roll relative to said control means to clear of said control means, and means for axially moving said roll relative to said control means to bring a different set of cams into position for actuating said control means, and means for preventing relative axial movement except when said control means and said roll are moved clear of one another.

4. A timing device comprising a frame, a plurality of cam operated control means on said frame, a roll having sets of cams for actuating said control means, means for moving said roll relative to said control means to clear of said control means, and means for moving said roll axially relative to said control means to bring a different set of cams into position for actuating said control means, and interlocking means to prevent relative paraxial movement between said roll and control means when said roll is in operating position with respect to said control means.

5. In a timing device, a frame, a cam carrying roll, means for mounting said roll in said frame for bodily movement with respect thereto, a driven gear for said roll, a source of constant speed power mounted on said frame and having a drive gear in alignment with said driven gear, an idler gear adapted to mesh with said gears and means for supporting said gear from said roll mounting means and adapted to bodily move said idler gear into and out of mesh with said drive gear with bodily movement of said roll.

6. In a timing device, a frame, a plurality of control means mounted on said frame, a cam roll having a plurality of sets of cams thereon, supporting means for said cam roll pivotally mounted on said frame for swinging said roll from an operating position adjacent said control means to a shiftable position, means for axially shifting said supporting means to align a predetermined set of cams with said control means and means for swinging said supporting means to move said roll from its operating position to its shiftable position and vice versa.

7. In a timing device, a frame, a plurality of control means mounted on said frame, a cam roll having a plurality of sets of cams thereon, supporting means for said cam roll pivotally mounted on said frame for swinging said roll from an operating position adjacent said control means to a shiftable position, means for axially shifting said supporting means to align a predetermined set of cams with said control means, means for swinging said supporting means to move said roll from its operating position to its shiftable position and vice versa, and means for preventing operation of said shifting means when said roll is in its operating position.

8. In a timing device, a frame, a spaced plurality of control means mounted on said frame, a cam roll having a plurality of sets of cams thereon, each set having the same spacing as said control means and being axially contiguous an adjacent set, a shaft parallel to said roll and being rotatably and axially movably mounted in said frame, spaced roll mounting means rigidly secured to said shaft for rotatably supporting said roll, a cam device rotatably supported in said frame and engaged with said roll mounting means for pivotally moving said mounting means to bodily move said roll relative to said frame and disengage one set of cams from said control devices, and means for axially shifting said shaft to align another set of cams with said control devices.

9. In a timing device, a frame, a spaced plurality of control means mounted on said frame, a cam roll having a plurality of sets of cams thereon, each set having the same spacing as said control means and being axially contiguous an adjacent set, a shaft parallel to said roll and being rotatably and axially movably mounted in said frame, spaced roll mounting means rigidly secured to said shaft for rotatably supporting said roll, a cam device rotatably supported in said frame and engaged with said roll mounting means for pivotally moving said mounting means to bodily move said roll relative to said frame and disengage one set of cams from said control devices, means for axially shifting said shaft to align another set of cams with said control devices, and an interlocking device actuatable by said cam device into and out of locking engagement with said shaft to prevent axial movement of said shaft when one set of cams is engaged with said control devices and to permit such axial movement when said cam device is rotated to bodily move said roll.

10. In a timing device, a cam roll having a plurality of cams thereon, means for rotatably supporting said roll on said frame, a driven gear for rotating said roll, a source of constant speed power, a driving gear set having a plurality of coaxial stepped drive gears connected with said source to be driven thereby, an idler gear meshed with said driven gear and one of said stepped gears, means for axially shifting said supporting means, said roll and said driven gear relative to said gear set, and mounting means for said idler gear, said mounting means being shiftable with said supporting means and being pivotally supported coaxially with said driven gear to move said idler gear about said driven gear in meshed engagement therewith and into meshing engagement with another one of said gear set.

11. A timing device comprising a frame, a cam roll rotatably supported by said frame, means for rotating said roll, spaced cam-operated control devices mounted on said frame, a plurality of sets of cams on said roll, each set being spaced the same as said control devices, and means for effecting relative shifting movement of said cams and control devices to effect operative engagement between said control devices and one of said sets of cams.

12. A timing device comprising a frame, a plurality of spaced cam-operated control devices carried by said frame, a cam roll having a plurality of sets of cams thereon, each set being spaced the same as said control devices, a shaft rotatably and axially shiftably mounted in said frame, a plurality of arms rigidly secured to said shaft and having bearings therein for rotatably supporting said roll, said arms being swingable about said shaft to bodily move said roll away from said devices to disengage one set of cams therefrom and vice versa, and means for axially moving said shaft relative to said frame to align another set of cams with said control devices, said last means including a plurality of stop means corresponding to the number of sets of cams and having means for locking axially moving means with any one of said stop means.

HOWARD E. SOMES.